(12) United States Patent
Gierl et al.

(10) Patent No.: US 7,239,710 B2
(45) Date of Patent: Jul. 3, 2007

(54) STEREO RADIO RECEIVER WITH NOISE SUPPRESSION

(75) Inventors: Stefan Gierl, Karlsruhe (DE); Christoph Benz, Ohlsbach (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 906 days.

(21) Appl. No.: 10/215,646

(22) Filed: Aug. 9, 2002

(65) Prior Publication Data

US 2003/0078009 A1  Apr. 24, 2003

(51) Int. Cl.
*H04H 5/00* (2006.01)
(52) U.S. Cl. .................. 381/13; 381/11; 381/94.4
(58) Field of Classification Search ............... 381/13, 381/94.4, 86, 11
See application file for complete search history.

(56) References Cited

U.S. PATENT DOCUMENTS

| | | | |
|---|---|---|---|
| 4,490,838 A | 12/1984 | Nishioka et al. | 381/15 |
| 4,704,736 A | 11/1987 | Kasser | 455/213 |
| 5,226,088 A * | 7/1993 | Winterer et al. | 381/13 |
| 5,303,414 A | 4/1994 | Brinkhaus | 455/296 |
| 5,475,869 A | 12/1995 | Gomi et al. | 455/63 |
| 5,812,673 A * | 9/1998 | Nohara et al. | 381/13 |
| 6,690,805 B1 * | 2/2004 | Tsuji et al. | 381/13 |
| 6,788,923 B2 * | 9/2004 | Tsujishita et al. | 455/223 |
| 6,795,559 B1 * | 9/2004 | Taura et al. | 381/94.8 |

FOREIGN PATENT DOCUMENTS

| | | |
|---|---|---|
| DE | 35 24 847 | 1/1987 |
| DE | 41 03 064 | 8/1992 |
| DE | 44 45 983 | 6/1996 |
| DE | 196 10 455 | 6/1998 |
| EP | 0 208 082 | 1/1987 |
| EP | 0 661 822 | 1/1994 |

* cited by examiner

*Primary Examiner*—Stella Woo
(74) *Attorney, Agent, or Firm*—O'Shea, Getz & Kosakowski, P.C.

(57) ABSTRACT

For the purpose of largely suppressing the noise pulses caused in a stereo radio receiver in the reception signal, particularly by the ignition system of a motor vehicle, a digital field strength signal representing the analog field strength signal is produced for example by digitizing the analog field strength signal. The scanning values of the digital audio signal, for example of the (L+R) signal, are produced by interpolation for at least as long as the digital field strength signal is outside a presettable tolerance range.

37 Claims, 4 Drawing Sheets

STEREO RADIO RECEIVER WITH NOISE SUPPRESSION

BACKGROUND OF THE INVENTION

The invention relates to the field of audio receivers, and in particular to audio receivers that employ noise suppression to compensate for noise in the reception signal.

FM radio transmitters transmit a stereo multiplex signal, which is formed from an audio central signal (also referred to as a mono signal) with a frequency up to 15 KHz, a stereo pilot tone with a frequency of 19 KHz, and a stereo signal with a frequency of 23 KHz to 53 KHz.

The stereo multiplex signal is received by a stereo receiver and digitized by an analog-digital converter to provide a digital stereo multiplex signal. The digital stereo multiplex signal is processed in a stereo decoder to produce a (L−R) signal and a (L+R) signal. By forming sum and difference signals from the (L−R) signal and the (L+R) signal, a stereo matrix calculates the audio signal for the left channel, often referred to as the L signal, and the audio signal for the right channel, often referred to as the R signal.

In contrast to a fixed stereo radio receiver, reception on a mobile stereo radio (e.g., a receiver built into a motor vehicle) is frequently disturbed by various, sometimes even inadequate, reception conditions due to the topography, multi-path reception, or radio shadows. In addition to these reception problems caused by the topography of the terrain, the electrical system (e.g., the ignition system) of a motor vehicle also causes noise pulses in the reception signal of the stereo radio receiver.

Known techniques for suppressing reception problems are controlling the channel separation (i.e., the continuous blending of stereo to mono reproduction), immediate switching from stereo to mono reproduction, use of low-pass filters, and noise blanking in which the reception signal is muted for a presettable time.

Noise blanking at the level of the stereo multiplex signal proves to be especially effective in suppressing noise caused by multi-path reception because it prevents noise pulses from propagating to the audio level. However, noise blanking has the disadvantage that gaps are produced in the reception signal.

Switching from stereo to mono reproduction is especially suitable with declining reception field strengths (i.e., with increasing noise components) to improve reception quality. The disadvantage of switching from stereo to mono reproduction is that stereophonic quality becomes unavailable.

Needle- or pulse-shaped noises caused for example by the ignition system of a motor vehicle can be largely suppressed by a low-pass filter. However, the total acoustic pattern is adversely affected by the filtering.

Techniques are also known that provide for interpolation of scanning values in the stereo multiplex signal to suppress individual noise pulses. However, these techniques require a relatively high scanning rate, leading to a high manufacturing cost.

Therefore, there is a need to suppress noise in the reception signal of a stereo radio receiver, as well as a stereo radio receiver, so that stereo reproduction that lasts as long as possible is obtained at relatively low manufacturing cost when there is noise in the reception signal.

SUMMARY OF THE INVENTION

Briefly, according to an aspect of the invention, a stereo receiver includes a radio receiver that receives a reception signal and provides a stereo multiplex signal and a field strength signal indicative thereof. A decoder receives the stereo multiplex signal and provides a digital (L−R) signal and a digital (L+R) signal, which are stored in memory. A comparator compares the value of the field strength signal against a predetermined threshold, and when the field strength signal is outside the predetermined threshold the comparator issues a trigger signal. An interpolator unit provides interpolated (L+R) signal values in response to the trigger signal, and the interpolated (L+R) signal values are input to a stereo matrix unit in response to the trigger signal, and the stereo matrix unit provides a left stereo signal and a right stereo signal.

A digital field strength signal representing the analog field strength signal is produced, and scanning values of the digital audio signal are produced by interpolation for at least as long as the digital field strength signal remains outside a presettable tolerance range.

The digital field strength signal can be produced for example by digitizing the analog field strength signal. However, it can also be derived from a digital IF signal from the IF stage of the stereo radio receiver. A third alternative provides for deriving the digital field strength signal from the stereo multiplex signal. To do this, the stereo multiplex signal for example can be analyzed according to the spectral subtraction method. The minimum power density of the noisy stereo multiplex signal is determined. The digital field strength is derived from the minimum power density that represents the analog field strength signal. The spectral subtraction method and determination of the minimum power density are described and explained in DE 44 45 983 C2.

One embodiment of the invention provides for setting the tolerance range around an average value that is determined by the time averaging of the analog or digital field strength signal. The tolerance range follows the changes in reception field strength over time. The average value determines the position of the tolerance range.

In the interpolation of the scanning values, the digital audio signal is stored in at least one intermediate memory.

In one embodiment, the (L−R) signal and the (L+R) signal are each temporarily stored in an intermediate memory located between the stereo decoder and the stereo matrix of the stereo radio receiver. In this embodiment, it is sufficient to interpolate only the scanning values of the (L+R) signal (i.e., interpolation of the scanning values of the (L−R) signal is not necessary).

Another embodiment provides for intermediate storage of the L signal and the R signal, each in an intermediate memory behind the stereo matrix. In this embodiment, both the scanning values of the L signal and those of the R signal are interpolated.

Another embodiment of the invention provides not only for replacing the scanning values of the audio signal located in the interpolation interval established by the tolerance range by interpolated scanning values, but also for replacing a presettable number of scanning values located in front of and/or after the interpolation interval by interpolated scanning values. This measure is characterized by the advantage that the transient and decaying processes are taken into account in the interpolation, thus improving the acoustic pattern. Moreover, inaccuracies in the trigger moment are compensated by these measures.

A trigger generator produces a trigger signal for marking the noisy scanning values of the audio signal to be replaced by the interpolated scanning values when the digital field strength signal is outside the tolerance range. The duration of the trigger signal thus determines the length of the interpolation interval.

Preferably, interpolation is performed with Lagrange polynomials. In the interpolation of M scanning values with a Lagrange polynomial of the nth degree, (N+1)/2 scanning values are provided as support points in front of and behind the interpolation interval. To suppress noise pulses caused by the ignition system of a motor vehicle, values from 10 to 20 for M and from 1 to 3 for N for example are particularly suitable.

In addition, the stereo receiver can be switched at least during the interpolation interval from stereo to mono reproduction for interpolation. In this case, only the scanning values of the mono signal have to be interpolated. In order largely to filter out the transient and decay processes in the acoustic pattern during interpolation, it is advisable to switch the stereo radio receiver from stereo reproduction to mono reproduction before the interpolation interval for a presettable period of time. By analogy to this measure, the switch is not made immediately from mono reproduction to stereo reproduction at the end of the interpolation interval, but rather the switch to stereo reproduction takes place with a presettable time delay.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
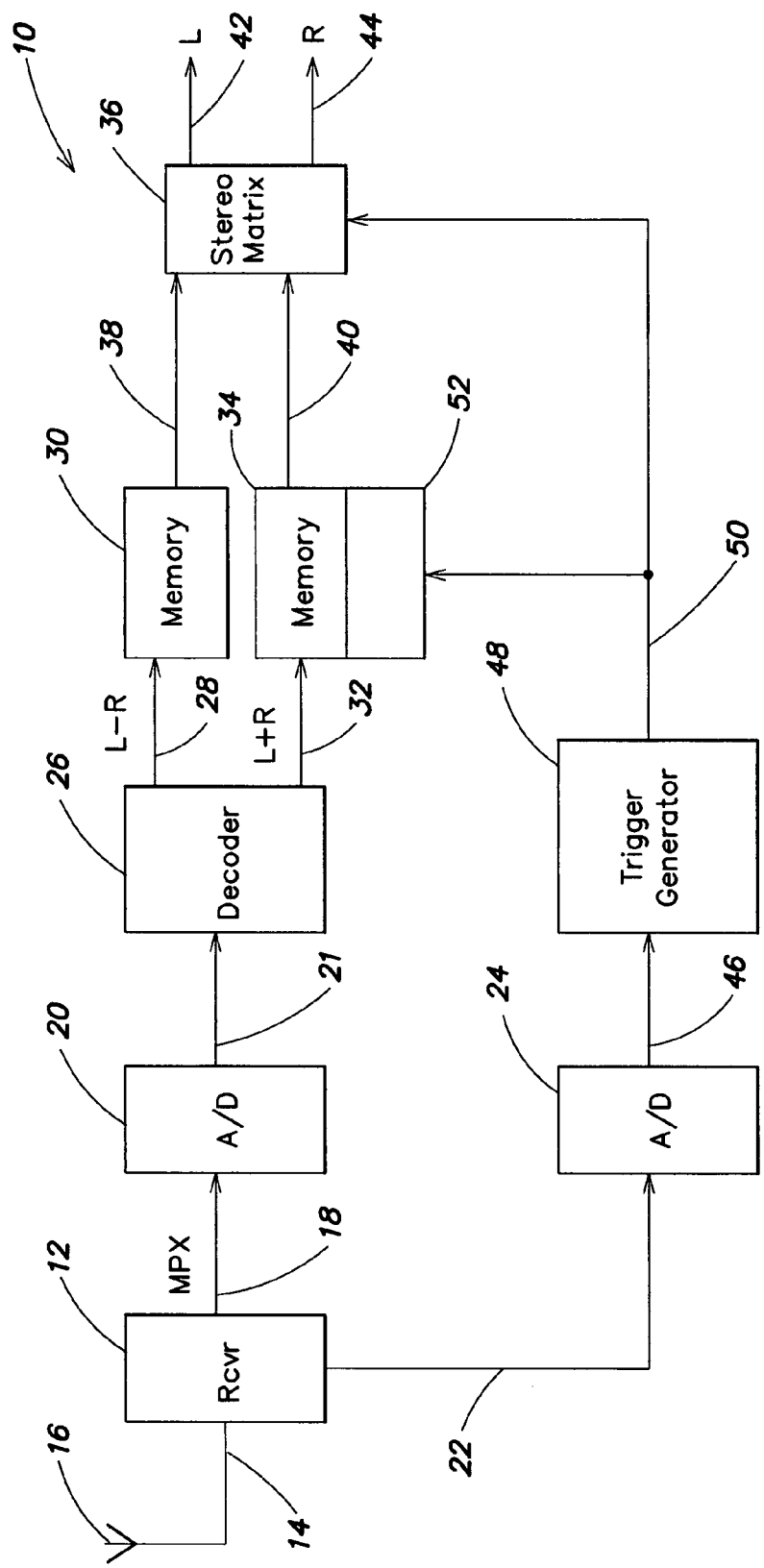
FIG. 1 is a block diagram illustration of a stereo receiver.

FIG. 1 is a block diagram illustration of a stereo receiver 10. The receiver 10 includes a receiver unit 12 that receives a reception signal on a line 14 from an antenna 16. The receiver unit 12 provides a stereo multiplex signal on a line 18 to a first analog-to-digital converter 20. The receiver unit 12 also provides an analog field strength signal on a line 22 to a second analog-to-digital converter 24. The first analog-to-digital converter 20 provides a digitized stereo multiplex signal on a line 21 to a stereo decoder 26. The stereo decoder 26 provides a (L−R) signal on a line 28 to a first intermediate memory 30, and a (L+R) signal on a line 32 to a second intermediate memory 34. The output of the first intermediate memory 30 and the second intermediate memory 34 are input to a stereo matrix 36, on lines 38, 40, respectively. The stereo matrix 36 provides an L-signal on a line 42 and a R-signal on a line 44.

The second analog-to-digital converter 24 provides a digital field strength signal on a line 46 to a trigger generator 48, which provides a trigger signal on a line 50 to an interpolation unit 52 and the stereo matrix unit 36.

From the digital stereo multiplex signal on the line 21, a stereo decoder 26 produces the digital (L−R) signal stored temporarily in the intermediate memory 30 and the (L+R) signal stored temporarily in the intermediate memory 34. The digitized field strength signal on the line 46 controls the trigger generator 48, which sends a trigger signal on the line 50 to the control input of the stereo matrix 36 and the interpolation unit 52 when the digital field strength signal on the line 46 is located outside a presettable tolerance range. As a result, the scanning values of the (L+R) signal to be replaced by interpolated scanning values are tagged. During the interpolation interval defined by the digital field strength signal and the presettable tolerance range, the interpolation unit 52 replaces the scanning values of the (L+R) signal with interpolated scanning values. In the stereo matrix 36, the scanning values for the L signal and the R signal are calculated from the scanning values of the (L−R) signal delivered by the intermediate memory 30 and the scanning values of the (L+R) signal delivered by the intermediate memory 34 by sum and difference formation.

Figure 2:
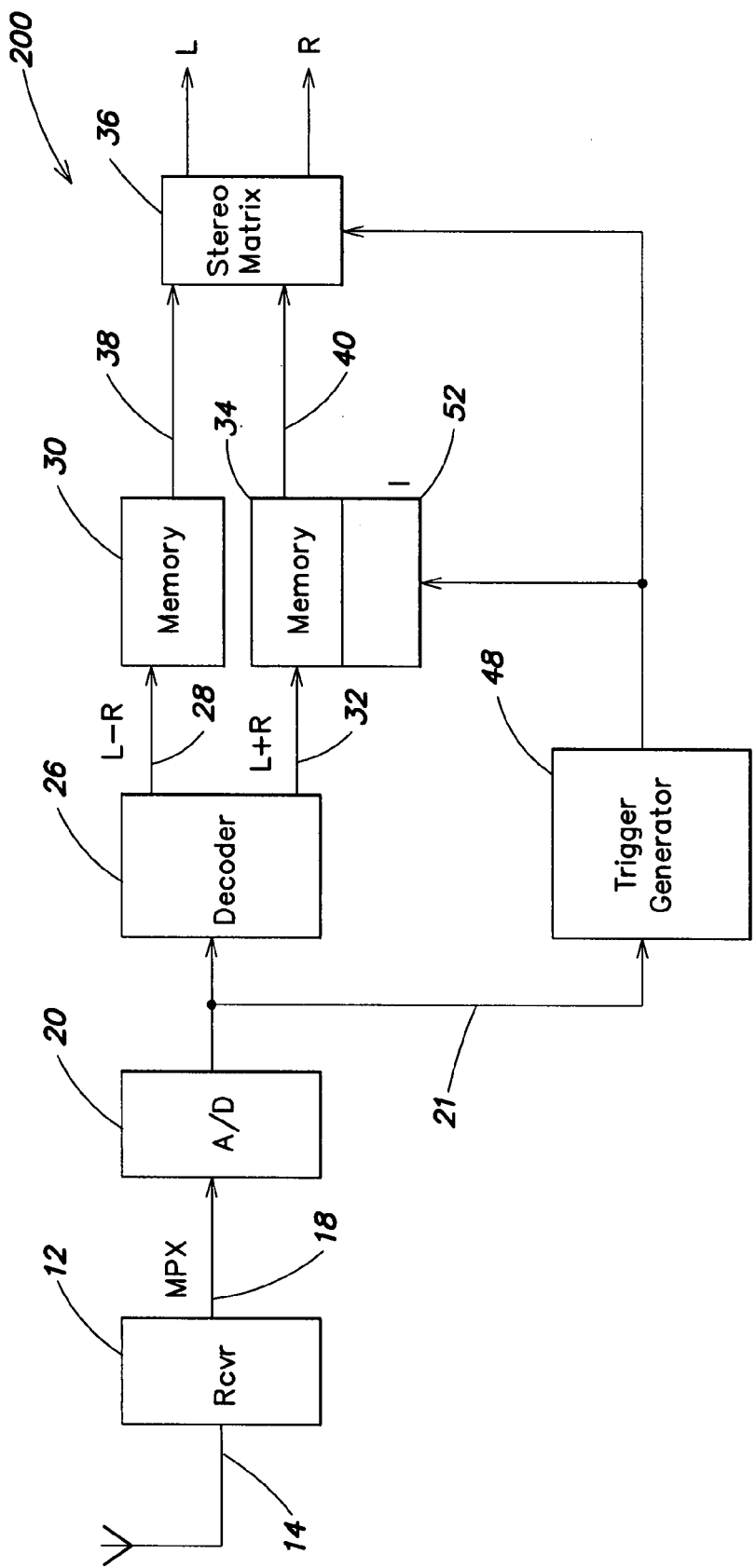
FIG. 2 is a block diagram illustration of a first alternative embodiment stereo receiver.

FIG. 2 is a block diagram illustration of a first alternative embodiment stereo receiver 200. This embodiment is substantially the same as the embodiment illustrated in FIG. 1, with the principal exception that the first analog-to-digital converter 20 provides the digitized stereo multiplex signal on the line 21 to both the stereo decoder 26 and the trigger generator 48. The digital stereo multiplex signal on the line 21 serves as the digital field strength signal because it reproduces the analog field strength signal. An advantage of the first and second embodiments is that only the scanning values of the (L+R) signal need be interpolated.

Figure 3:
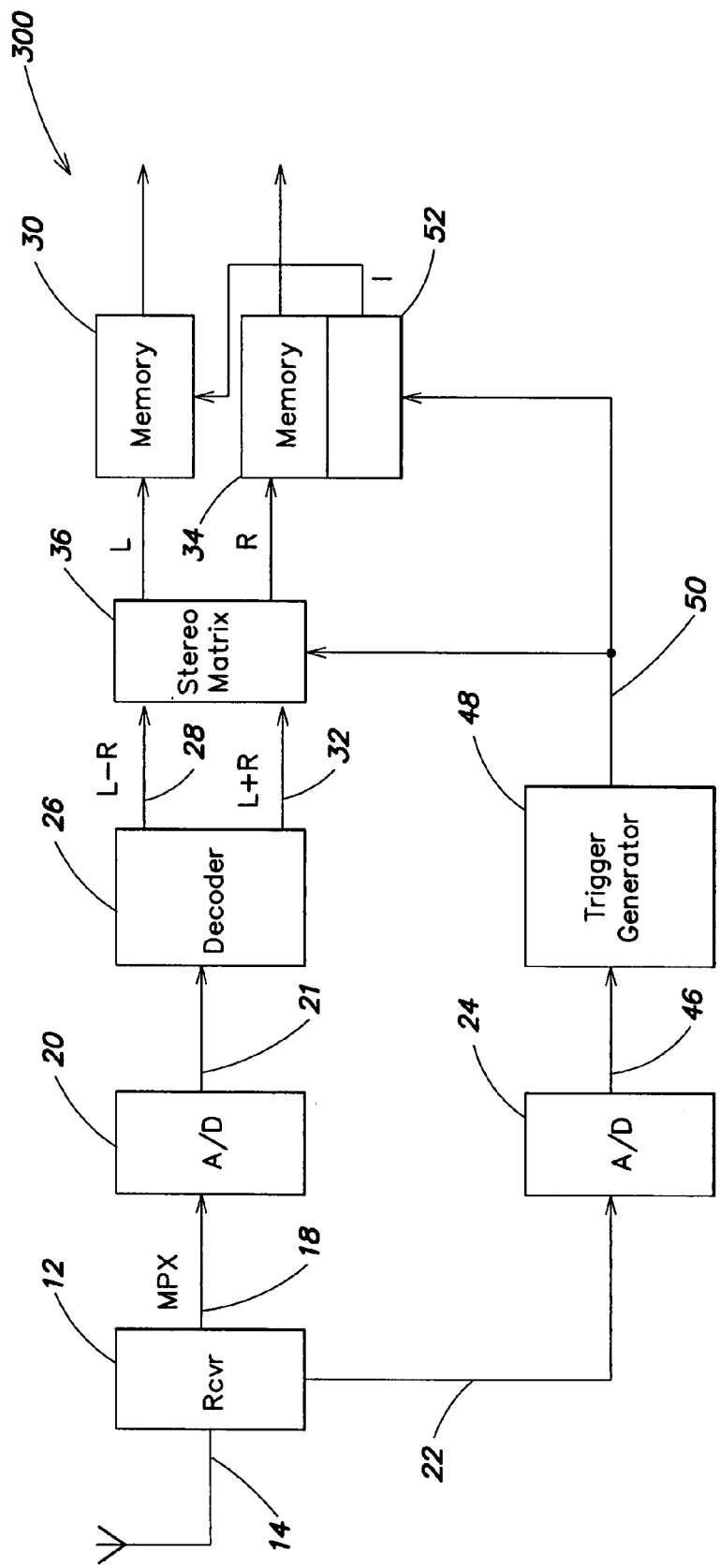
FIG. 3 is a block diagram illustration of a second alternative embodiment stereo receiver.

FIG. 3 is a block diagram illustration of a second alternative embodiment stereo receiver 300. This embodiment is substantially the same as the embodiments illustrated in FIGS. 1 and 2 with the principal exception that the two intermediate memories 30, 34 and the interpolation unit 52 are located downstream of the stereo matrix 36. That is, the two intermediate memories 30, 34 and the interpolation unit 52 are no longer located between the stereo decoder 26 and stereo matrix 36, but rather are now located after the stereo matrix 36. As a result, the scanning values of the L signal are stored temporarily in the intermediate memory 30, while the scanning values of the R signal are stored temporarily in the intermediate memory 34. During the interpolation interval, the interpolation unit 52 replaces the scanning values of the L signal and the R signal by interpolated scanning values.

Figure 4:
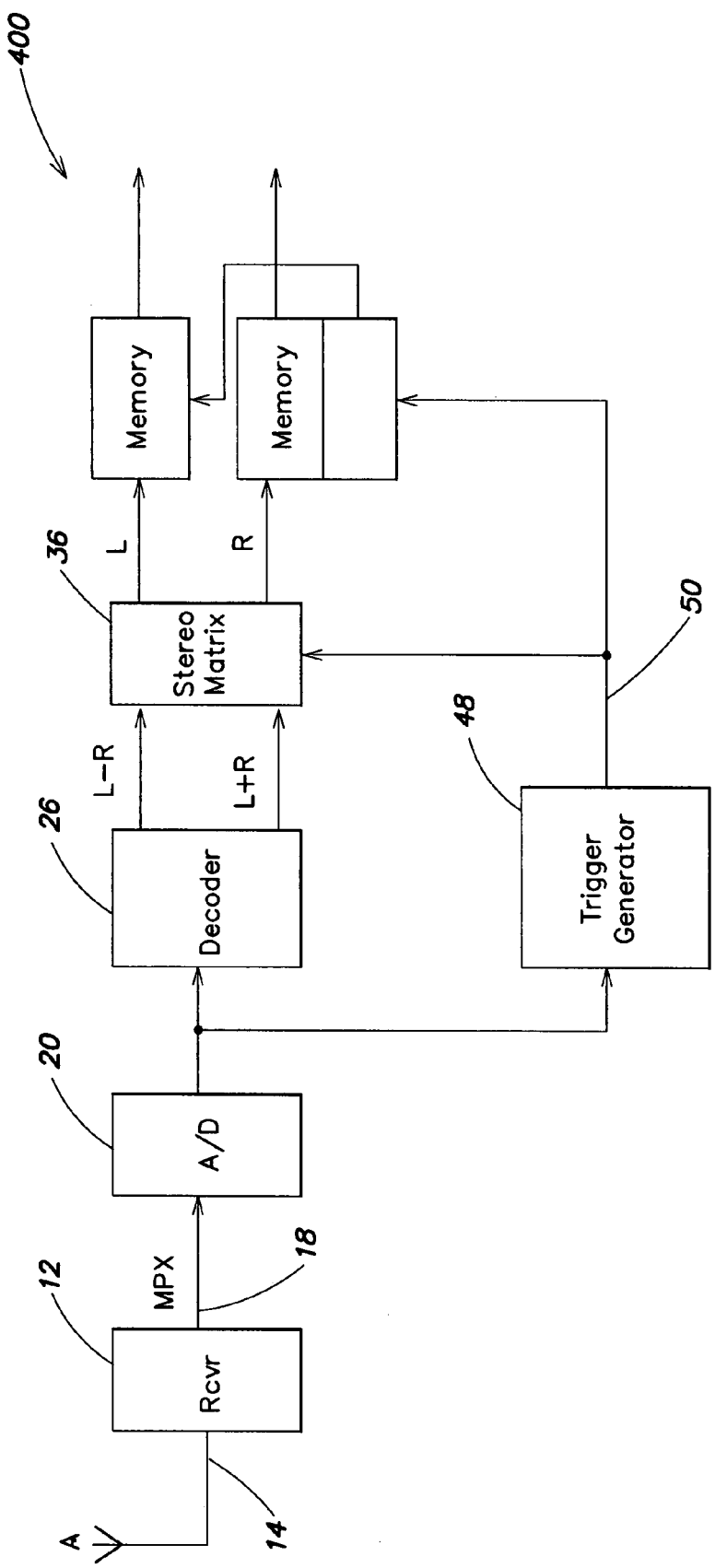
FIG. 4 is a block diagram illustration of a third alternative embodiment stereo receiver.

A fourth embodiment shown in FIG. 4 differs from the embodiment illustrated in FIG. 3 in that the output of the first analog-digital converter 20 is also connected with the input of the trigger generator 48. The second analog-digital converter is not required in this embodiment, since the digitized stereo multiplex signal on the line 21 serves as the digital field strength signal.

The technique of the present invention is generally suited for suppressing noise in the reception signal of a stereo radio receiver. In particular, pulse-type noises such as those caused by the ignition system of a motor vehicle are effectively suppressed by the technique of the present invention. An advantage of the present invention is that the switch from stereo reproduction to mono reproduction does not take place until the noise in the reception signal is much stronger than with the known methods and stereo radio receivers.

Although the present invention has been shown and described with respect to several preferred embodiments thereof, various changes, omissions and additions to the form and detail thereof, may be made therein, without departing from the spirit and scope of the invention.

What is claimed is:
1. A method for noise suppression in the reception signal of a stereo radio receiver in which the digital (L−R) signal and the digital (L+R) signal are produced in a stereo decoder from the analog stereo multiplex signal and the digital L signal and the digital R signal are produced in a stereo matrix, where a digital field strength signal representing the analog field strength signal is produced and the scanning values of the digital audio signal are produced by interpolation performed with Lagrange polynomials for at least as long as the digital field strength signal is outside a presettable tolerance range, and the stereo radio receiver is switched from stereo to mono reproduction mode while the digital field strength signal is outside a presettable tolerance range.

2. The method of claim 1, where the digital field strength signal is produced by digitizing the analog field strength signal.

3. The method of claim 1, where the digital field strength signal is produced from a digital IF signal from the IF stage of the stereo radio receiver.

4. The method of claim 1, where the digital field strength signal is derived from the stereo multiplex signal.

5. The method of claim 4, where an average field strength by which the position of the tolerance range is determined is established by time-averaging the analog or digital field strength signal.

6. The method of claim 1, where the digital audio signal is temporarily stored in at least one intermediate memory.

7. The method of claim 1, where the (L−R) signal and the (L+R) signal are each temporarily stored in an intermediate memory located between the stereo decoder and the stereo matrix or the L signal and the R signal are each stored temporarily in an intermediate memory located behind the stereo matrix.

8. The method of claim 1, where presettable number of scanning values of the audio signal located in front of or behind the interpolation interval set by the tolerance range is also replaced by interpolated scanning values.

9. The method of claim 1, where trigger generator produces a trigger signal to tag noisy scanning values of the audio signal to be replaced by interpolated scanning values when the digital field strength signal is outside the tolerance range.

10. The method of claims 9, where the duration of the trigger signal determines the length of the interpolation interval.

11. The method of claim 1, where the interpolation is performed with Lagrange polynomials.

12. The method of claim 1, where when M scanning values are interpolated with an nth degree polynomial, (N+1)/2 scanning values are provided as support points before and after the interpolation interval.

13. The method of claim 12, where the (L−R) signal and the (L+R) signal are temporarily stored and the (L+R) signal and/or the (L−R) signal are interpolated.

14. The method of claim 1, where the L signal and the R signal are temporarily stored and interpolated.

15. The method of claim 1, where the stereo receiver is switched to mono reproduction for a presettable period of time before or after the interpolation interval.

16. The method of claim 15, where the switch from mono to stereo reproduction takes place with a time delay.

17. A stereo radio receiver, comprising a reception unit to produce the analog stereo multiplex signal with a stereo decoder to produce the digital (L−R) signal and digital (L+R) signal from the analog stereo multiplex signal as well as with a stereo matrix to produce the digital L signal and the digital R signal from the (L−R) signal and the (L+R) signal, where a digital field strength signal representing the analog field strength signal can be produced and that the scanning values of the digital audio signal can be produced by interpolation at least as long as the digital field strength signal is outside a presettable tolerance range, and the stereo radio receiver is switched from stereo to mono reproduction mode while the digital field strength signal is outside a presettable tolerance range.

18. The stereo radio receiver of claim 17, where the digital field strength signal can be produced by digitizing the analog field strength signal.

19. The stereo radio receiver of claim 17, where the digital field strength signal can be produced from a digital IF signal from the IF stage of the stereo radio receiver.

20. The stereo radio receiver of claim 17, where the digital field strength signal can be derived from the stereo multiplex signal.

21. The stereo radio receiver of claim 20, where an average field strength can be determined by time-averaging the analog or digital field strength signal to determine the position of the tolerance range.

22. The stereo radio receiver of claim 21, where the digital audio signal can be temporarily stored in at least one intermediate memory.

23. The stereo radio receiver of claim 22, where the (L−R) signal and the (L+R) signal can each be temporarily stored in an intermediate memory located between the stereo decoder and the stereo matrix or the L signal and the R signal can be temporarily stored in an intermediate memory located behind the stereo matrix.

24. The stereo radio receiver of claim 23, where a presettable number of scanning values of the audio signal located in front of or behind the interpolation interval set by the tolerance range are also replaceable by interpolated scanning values.

25. The stereo radio receiver of claim 24, where a trigger generator is provided to produce a trigger signal to tag the scanning values of the audio signal to be replaced by interpolated scanning values when the digital field strength signal is outside the tolerance range.

26. The stereo radio receiver of claim 25, where the duration of the trigger signal determines the length of the interpolation interval.

27. The stereo radio receiver of claim 17, where the interpolation is performed with Lagrange polynomials.

28. The method of claim 17, where (N+1)/2 scanning values are provided as support points before and after the interpolation interval in the interpolation of M scanning values with an nth degree polynomial.

29. The stereo radio receiver of claim 17, where the (L−R) signal and the (L+R) signal are temporarily storable and the (L+R) signal and/or the (L−R) signal are interpolatable.

30. The stereo radio receiver of claim 28, where the L signal and the R signal are temporarily storable and interpolatable.

31. The stereo radio receiver of claim 17, where the stereo receiver is likewise switched to mono reproduction for a presettable period of time before or after the interpolation interval.

32. The stereo radio receiver of claim 31, where the switch from mono to stereo reproduction takes place with a time delay.

33. The stereo radio receiver of claims 32, where the reception signal is at the antenna input of a reception unit whose first output, where the stereo multiplex signal can be tapped, is connected to the input of a first analog-digital converter, and whose second output, where the analog field strength signal can be tapped, is connected to the input of a second analog-digital converter, that the output of a first analog-digital converter is connected to the input of a stereo decoder whose first output, where the (L−R) signal can be tapped, is connected to the input of a first intermediate memory while its second output, where the (L+R) signal can be tapped, is connected to the input of a second intermediate memory, that the output of the first and second intermediate memories are connected to the two audio inputs of the stereo matrix at whose outputs the L signal and the R signal can be tapped, that the output of the second analog-digital converter is connected to the input of a trigger generator, and the output of the trigger generator is connected to the control input of the stereo matrix and to an interpolation unit connected to the second intermediate memory.

34. The stereo radio receiver of claim 32, where the reception signal is at the antenna input of a reception unit whose output, where the stereo multiplex signal can be tapped, is connected to the input of an analog-digital converter, whose output is connected to the input of a trigger generator and the input of the stereo decoder, whose first output where the (L−R) signal can be tapped is connected to the input of a first intermediate memory while its second output, where the (L+R) signal can be tapped, is connected to the input of a second intermediate memory, that the output of the first and second intermediate memories are connected with the two audio inputs of the stereo matrix, at whose outputs the L signal and the R signal can be tapped, and that the output of the trigger generator is connected to the control input of the stereo matrix and to an interpolation unit connected to the second intermediate memory.

35. The stereo radio receiver of claim 32, where the reception signal is at the antenna input of a reception unit whose first output, where the stereo multiplex signal can be tapped, is connected to the input of a first analog-digital converter, and whose second output, where the analog field strength signal can be tapped, is connected to the input of a second analog-digital converter, that the output of the first analog-digital converter is connected to the input of the stereo decoder whose first output, where the (L−R) signal can be tapped, is connected to the first audio input of the stereo matrix, while its second output, where the (L+R) signal can be tapped, is connected to the second audio input of the stereo matrix, that the output of the second analog-digital converter where the digital field strength signal can be tapped is connected to the input of a trigger generator whose output is connected to the control input of the stereo matrix and the control input of an interpolation unit connected to a first intermediate memory and a second intermediate memory, and that the first output of stereo matrix where the L signal can be tapped is connected to the input of a first intermediate memory and the second output of the stereo matrix where the R signal can be tapped is connected to the input of a second intermediate memory.

36. The stereo radio receiver of claim 32, where the reception signal is at the antenna input of a reception unit whose output, where the stereo multiplex signal can be tapped, is connected to the input of an analog-digital converter, whose output is connected to the input of a trigger generator and a stereo decoder whose first output, where the (L−R) signal can be tapped, is connected to the first audio input of the stereo matrix while its second output, where the (L+R) signal can be tapped, is connected to the second audio input of the stereo matrix, that the output of the trigger generator is connected to the control input of the stereo matrix and an interpolation unit is connected to a first intermediate memory and a second intermediate memory, that the first output of the stereo matrix where the L signal can be tapped is connected to the input of a first intermediate memory and the second output of the stereo matrix where the R signal can be tapped is connected to the input of a second intermediate memory.

37. A stereo receiver that receives a reception signal, the stereo receiver comprising:
   a radio receiver that receives the reception signal and provides a stereo multiplex signal and a field strength signal indicative thereof;
   a decoder that receives the stereo multiplex signal and provides a digital (L−R) signal and a digital (L+R) signal;
   memory that receives and stores the digital (L−R) signal values and the digital (L+R) signal values;
   a comparator that compares the value of the field strength signal against a predetermined threshold, and initiates a trigger signal when the field strength signal is outside said predetermined threshold;
   an interpolator unit that receives the stored digital (L+R) signal values and provides interpolated (L+R) signal values in response to the trigger signal; and
   a stereo matrix unit that receives the interpolated (L+R) signal values in response to the trigger signal, and provides a left stereo signal and a right stereo signal for stereo reproduction while the digital field strength signal is within the predetermined threshold, and provides the interpolated (L+R) signal for mono reproduction while the digital field strength signal is outside the predetermined threshold.

* * * * *

UNITED STATES PATENT AND TRADEMARK OFFICE
CERTIFICATE OF CORRECTION

PATENT NO.        : 7,239,710 B2                                          Page 1 of 1
APPLICATION NO.   : 10/215646
DATED             : July 3, 2007
INVENTOR(S)       : Gierl et al.

It is certified that error appears in the above-identified patent and that said Letters Patent is hereby corrected as shown below:

Column 5
In the claims, claim 8, line 35, before "trigger" insert --a--
In the claims, claim 10, line 40, delete "claims" and insert --claim--

Column 6
In the claims, claim 33, delete "claims" and insert --claim--

Column 8
In the claims, claim 37, delete "digita1" and insert --digital--

Signed and Sealed this

Twenty-first Day of August, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,239,710 B2 | Page 1 of 1 |
| APPLICATION NO. | : 10/215646 | |
| DATED | : July 3, 2007 | |
| INVENTOR(S) | : Gierl et al. | |

It is certified that error appears in the above-identified patent and that said Letters Patent is hereby corrected as shown below:

<u>Column 5</u>

In the claims, claim 8, line 31, before "presettable" insert --a--

Signed and Sealed this

Eighteenth Day of September, 2007

JON W. DUDAS
*Director of the United States Patent and Trademark Office*